United States Patent
Pfleger

(10) Patent No.: US 6,733,186 B2
(45) Date of Patent: May 11, 2004

(54) OPTICAL CONNECTION VERIFICATION APPARATUS AND METHOD

(75) Inventor: Franz Pfleger, Boca Raton, FL (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 79 days.

(21) Appl. No.: 09/965,445

(22) Filed: Sep. 27, 2001

(65) Prior Publication Data

US 2003/0059171 A1 Mar. 27, 2003

(51) Int. Cl.[7] .................. G02B 06/36; G02B 06/38; G02B 06/02
(52) U.S. Cl. .................. 385/75; 385/53; 385/88; 385/128
(58) Field of Search .................. 385/55, 58, 70, 385/75, 88, 101, 123–128, 139, 12, 53; 439/577; 250/227.11

(56) References Cited

U.S. PATENT DOCUMENTS

| | | | | |
|---|---|---|---|---|
| 4,158,478 A | | 6/1979 | Dáuria et al. | 350/96.23 |
| 4,295,043 A | * | 10/1981 | Eibner et al. | 250/227.24 |
| 4,763,981 A | | 8/1988 | Wilkins | 350/96.23 |
| 4,869,566 A | * | 9/1989 | Juso et al. | 385/53 |
| 4,896,939 A | | 1/1990 | O'Brien | 350/96.23 |
| 4,907,588 A | * | 3/1990 | Burston | 606/11 |
| 5,042,903 A | | 8/1991 | Jakubowski | 385/101 |
| 5,293,678 A | | 3/1994 | Chamberlain et al. | 29/401.1 |
| 5,394,503 A | * | 2/1995 | Dietz, Jr. et al. | 385/135 |
| 5,418,878 A | | 5/1995 | Sass et al. | 385/101 |
| 5,467,420 A | | 11/1995 | Rohrmann et al. | 385/101 |
| 5,468,913 A | | 11/1995 | Seaman et al. | 174/102 R |
| 5,539,851 A | | 7/1996 | Taylor et al. | 385/101 |
| 5,546,413 A | | 8/1996 | Lebby et al. | 372/6 |
| 5,557,698 A | | 9/1996 | Gareis et al. | 385/101 |
| 5,574,815 A | | 11/1996 | Kneeland | 385/101 |
| 5,708,745 A | | 1/1998 | Yamaji et al. | 385/92 |
| 5,764,043 A | * | 6/1998 | Czosnowski et al. | 324/66 |
| 6,110,107 A | * | 8/2000 | Bellahsene et al. | 600/182 |
| 6,317,553 B1 | * | 11/2001 | Harper et al. | 385/128 |
| 6,375,362 B1 | * | 4/2002 | Heiles et al. | 385/75 |
| 6,463,198 B1 | * | 10/2002 | Coleman et al. | 385/101 |

FOREIGN PATENT DOCUMENTS

| | | | |
|---|---|---|---|
| DE | 41 39 918 A-1 | 6/1993 | |
| EP | 136399 A | * 4/1985 | G01T/01/06 |
| WO | WO 00/23838 | 4/2000 | |

* cited by examiner

Primary Examiner—Brian Healy
Assistant Examiner—Sarah U Song
(74) Attorney, Agent, or Firm—Brian K. Johnson

(57) ABSTRACT

A fiber-optic cable includes a conductive coating formed around an optical fiber. The conductive coating may be in the shape of a band or ring located at a terminal end of the fiber, or may extend along the entire length of the fiber or a portion thereof. For protection purposes, the fiber is covered with a buffer made from a plastic or polymer. The fiber-optic cable may be attached to a plug or receptacle of a connector. Preferably, the cable is attached to the plug. Under these circumstances, the receptacle would be equipped with a verification circuit for confirming that the plug has been properly installed into the receptacle housing. An electronic device may be used to alert a user as to whether proper installation has occurred. In addition to providing an indication that an optical connection has been made, the conductive coating may be adapted to carry electrical signals. In this way, the fiber-optic cable would operate as an electrical transmission line and an optical transmission line.

26 Claims, 3 Drawing Sheets

OPTICAL CONNECTION VERIFICATION APPARATUS AND METHOD

BACKGROUND OF THE INVENTION

1. Field of the Invention

This invention generally relates to connecting optical fibers, and more particularly to a fiber-optic cable and cable connector equipped with a circuit for verifying that an optical connection has been established. The invention is also a method for making a connector of this type.

2. Description of the Related Art

In order to ensure that an optical system will operate reliably, it is important to confirm that its optical connectors are properly installed. One proposed approach which addresses this problem involves attaching an electrical wire to an external portion of an optical fiber. In operation, this wire carries electrical signals from a connector attached to one end of the fiber to a connector attached to a second end of the fiber. When the signals are received by the second connector, it is determined that a valid, optical connection exists. In systems of this type, the connectors are usually plug-type connectors which are adapted to interface to a controller of a network management system.

The proposed approach described above has proven to have several drawbacks. First, the electrical wires consume space within the connector, and their attachment to the fiber increases the fiber size. This undermines attempts at miniaturization and increases the overall cost of the system. Also, because the electrical wires are externally attached to the fiber, they are susceptible to damage, which compromises the reliability of the system.

In view of the foregoing considerations, it is apparent that there is a need for a fiber-optic cable connector which uses an improved circuit for confirming that an optical connection has been established, and moreover one which consumes less space and is more affordable to implement than conventional approaches.

SUMMARY OF THE INVENTION

In one preferred embodiment of the present invention a fiber-optic cable and cable connector is provided which contain a verification circuit that is more affordable, consumes less space, and is more efficient than conventional circuits used to perform this function.

In another aspect of the present invention, a verification circuit is at least partially integrated within the internal structure of an optical fiber.

In another preferred embodiment of the present invention, a verification circuit is provided as described above which is equipped with or is connected to an electronic device which informs a user that a proper optical connection has or has not been established.

The foregoing are achieved by providing a fiber-optic cable which includes a conductive coating formed on an optical fiber. The conductive coating may be in the shape of a band or ring located at a terminal end of the fiber, or may extend along the entire length of the fiber or a portion thereof. For protection purposes, the fiber is covered with a buffer made, for example, from a plastic or polymer. Through this conductive coating, connection of the optical fiber to either another fiber or to an opto-electronic device may at all times be confirmed.

The fiber-optic cable connector of the present invention includes a receptacle and plug, the latter of which is preferably connected to the terminal end of the fiber-optic cable of the invention. The receptacle is equipped with a verification circuit which confirms that the optical fiber in the plug has established an optical connection with the receptacle. The verification circuit includes a contact element at a location which coincides with a position of the conductive coating when the plug is inserted into the receptacle. When the conductive coating and contact element touch, an electronic device connected to the contact element provides a user with an indication that an optical connection has been made. If an optical connection is not made, the electronic device provides an indication of the same. The electronic device may be a light-emitting diode or audible alarm. In an alternative embodiment, the fiber-optic cable of the present invention may be incorporated into the receptacle of the connector. In this case, the verification circuit would be formed in the plug.

The power source for the alarm may be a battery incorporated into the receptacle housing or may derive from an electronic device to which the plug is connected. In addition to providing an indication that an optical connection has been made, the conductive coating may operate as a transmission line for carrying electrical signals, which may be analog or digital. Also, the invention is ideally suited for verifying optical connections between cables that contain fiber-optic bundles.

DESCRIPTION OF THE PREFERRED EMBODIMENTS

The present invention is fiber-optic cable equipped with a conductive coating along at least portion of its length. The present invention is also a fiber-optic cable connector equipped with a verification circuit for confirming that the connector has been properly installed. The cable and connector described herein may have a variety of uses including transmitting optical signals along voice and/or data networks, and in this regard may prove especially advantageous within wavelength-division multiplexed (WDM) systems and switching networks (optical cross-connects). The invention may also have more local applications such as between two electronic devices in a home or office environment.

Figure 1:
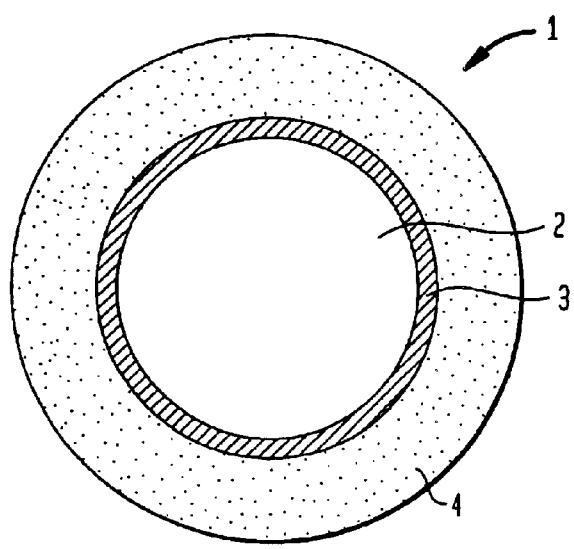
FIG. 1 is a diagram showing a cross-sectional view of a preferred embodiment of a fiber-optic cable in accordance with the present invention.

Referring to FIG. 1, a cross-sectional view of an optical fiber cable 1 constructed in accordance with the present invention includes an optical fiber 2, a conductive coating 3, and a buffer 4. The optical fiber may be a single-mode fiber, multi-mode fiber, or any other fiber conventionally known. Although not specifically shown, it is understood that the optical fiber has a cladding layer disposed around a core adapted for carrying optical signals. Preferably, the conductive coating is applied to this cladding layer.

Figure 2A:
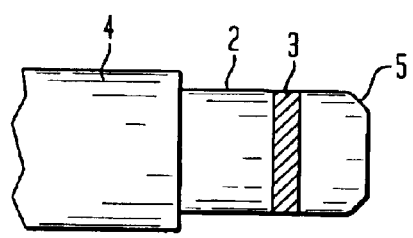
FIG. 2a is a diagram showing one possible configuration of the conductive coating of the fiber-optic cable of the present invention.
Figure 2B:
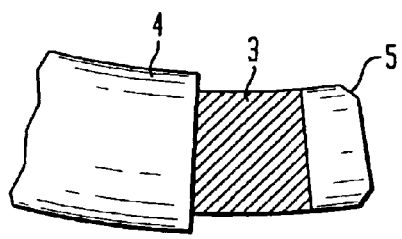
FIG. 2b is a diagram showing another configuration of this conductive coating.

In terms of materials, the conductive coating may be made of aluminum, copper, gold, silver, platinum, tungsten, and/or alloys thereof. Those skilled in the art can appreciate that other conductive materials may also be used. The conductive layer may be formed at a terminal end of the optical fiber only, or may extend along the entire length of the fiber or a portion thereof. FIG. 2a shows an exemplary embodiment where the conductive coating is formed only at a terminal end 5 of the optical fiber. The distance of the conductive coating from the optical fiber tip may be fixed to coincide with the location of contacts included in a verification circuit incorporated within a connector housing. FIG. 2b shows an exemplary embodiment where the conductive coating is formed along the length of the optical fiber. This length may be varied to suit the intended use of the cable.

The conductive coating of the present invention may be formed in accordance with any of a variety of optical fiber metallization techniques known in the art. One such technique involves placing an optical fiber in a sputtering chamber. A non-collimated ion beam is then used to thoroughly coat portions of the fiber along its exposed surfaces. While a single metal coating may be applied, it is preferable to apply multiple metal coatings to ensure proper adhesion and to attain appropriate physical and chemical characteristics that will satisfy the requirements of the verification circuit of the invention. Uniformity of the metal layers may be improved by rotating the fibers within the sputtering chamber.

To promote adhesion, the optical fiber may be coated with an initial adhesion-promoting layer made, for example, of titanium, nickel, or chromium. One or more outer layers may then be applied. If this two-layer approach is used, it is preferable to make the inner initial layer thinner than the outer layer(s). For example, an inner layer of titanium 450 angstroms thick may be formed on the optical fiber under an outer layer of gold with a thickness of 1.3 microns. To improve resiliency, the outer metal layer is preferably one which demonstrates heat- and/or oxidation-resistant characteristics. Such a metal may, for example, be one on which very thin and dense oxide layers can form in order to prevent oxidation. Aluminum is one example of such a metal.

The buffer is formed around the conductive coating in order to protect the fiber and coating from damage and/or deterioration. The buffer may be in the form of a jacket V which is flexible or rigid depending upon the intended use of the cable. The jacket may be made from plastic, a polymer such as Kevlar®, or other conventional materials. If desired, strengthening elements (e.g., steel or fiberglass rods) may be incorporated within the jacket to make the cable rigid.

Figure 3:
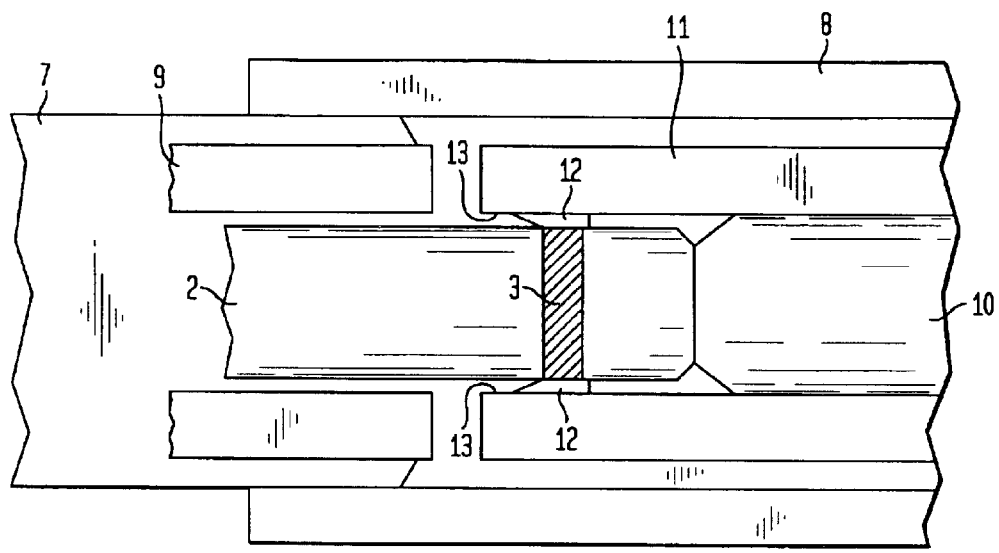
FIG. 3 is a diagram showing one embodiment of a fiber-optic cable connector in accordance with the present invention.

Referring to FIG. 3, a first embodiment of a fiber-optic cable connector in accordance with the present invention includes a plug or first connector 7 inserted into a receptacle housing or second connector 8. The plug includes a ferrule 9 which holds a fiber-optic cable such as shown in FIG. 2a. The terminal end of this cable protrudes from the ferrule so that it extends into the receptacle housing to abut with element 10, which may be another optical fiber or a light-detecting device.

The receptacle includes a housing portion 11 equipped with contacts 12 on upper and lower interior surfaces 13. The contacts are mounted at a location that corresponds to a position where the optical fibers are in abutting alignment so that optical signals from the fiber will successfully travel to the other fiber or light-detecting device. As shown, when the plug is properly inserted into the receptacle housing, the conductive coating 3 at the terminal end of optical fiber is coincident with contacts 12. In this position, the coating touches the contacts, causing a verification circuit to be activated to provide an indication that a proper connection has been established between the plug and receptacle.

Figure 4A:
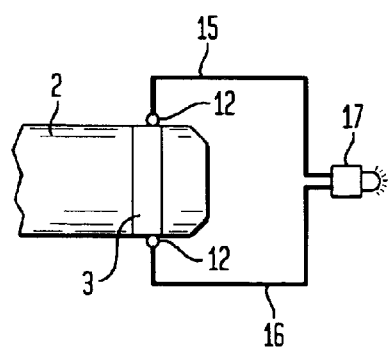
FIG. 4a is a diagram showing one possible configuration of a verification circuit included in the fiber-optic cable connector shown in FIG. 3.
Figure 4B:
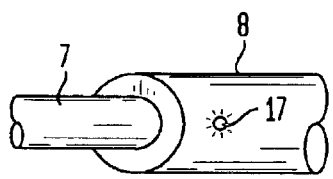
FIG. 4b is a diagram showing an example of an electronic device used with this connector.

FIG. 4a shows one possible configuration of the verification circuit of the present invention. This circuit includes a contact element 12, lead lines 15 and 16, and a light-emitting diode 17, the latter of which may be mounted in a visible position along a surface of the receptacle housing. The contact element may be two or more contacts disposed circumferentially around the interior surface of the receptacle housing, or the contact element may be a single ring contact. When the plug portion of the connector is fully inserted into the receptacle, the conductive coating on the optical fiber touches contact element 12. (If contact element 12 is in the form of two electrodes, the conductive coating may effectively operate as closing a switch between the electrodes.) This results in the activation of the light-emitting diode, which when viewed by a user confirms that a proper connection has been established. On the other hand, if the diode does not light, then the user knows that connection has not been properly made. The energy source for the verification circuit may, for example, be a battery incorporated within the receptacle housing or a power source of an electrical device to which the receptacle housing is connected.

Figure 5:
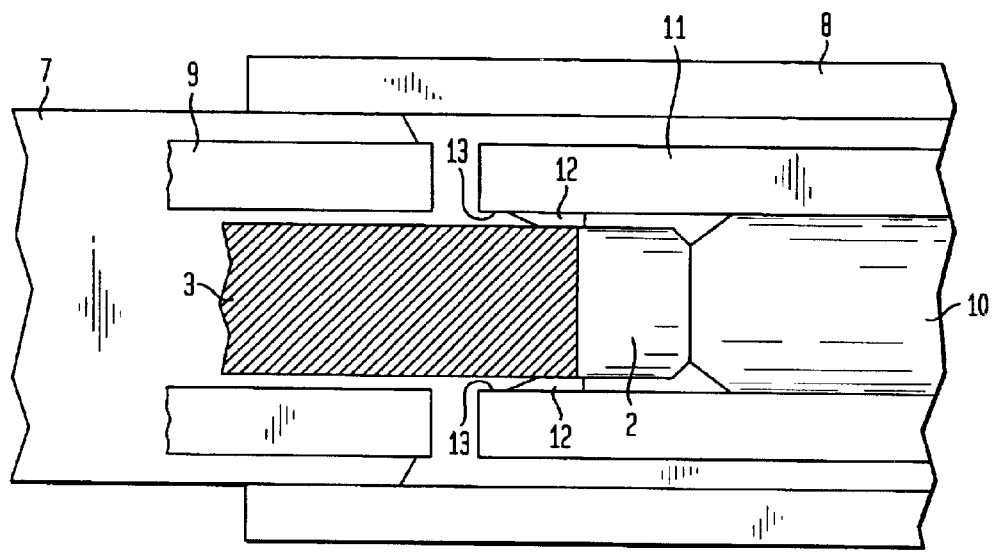
FIG. 5 is a diagram showing another embodiment of a fiber-optic cable connector in accordance with the present invention.
Figure 6:
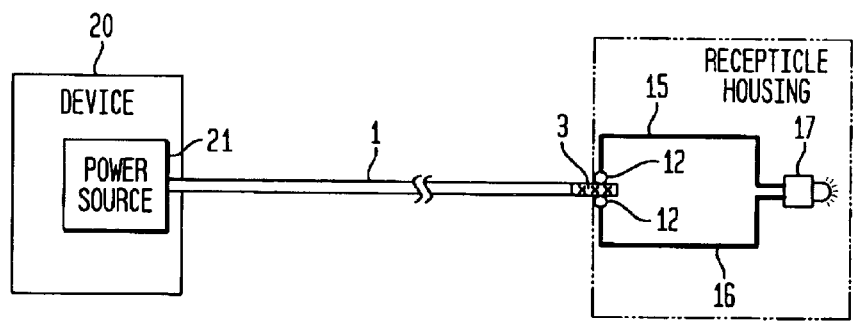
FIG. 6 is a diagram showing one possible configuration of a verification circuit included in the fiber-optic cable connector shown in FIG. 5.

Referring to FIG. 5, a second embodiment of a fiber-optic cable connector of the present invention includes a plug and receptacle similar to those shown in FIG. 3. However, the plug includes a ferrule which holds a fiber-optic cable such as shown in FIG. 2b. Here, contacts 12 touch conductive coating 3 which runs the entire length of the optical fiber. A verification circuit for this embodiment is shown in FIG. 6, where one end of the fiber-optic cable is connected to an electronic device 20 containing a power source 21. In operation, the power source sends a power signal along the conductive coating. When the conductive coating touches contacts 12 in the receptacle housing, an electronic device 17, for example a light-emitting diode, is activated to inform the user that a proper optical connection has been established between the plug and receptacle. As an alternative to the connector embodiments described herein, if the receptacle housing is connected to an electronic device, the light-emitting diode may be mounted along a surface of the electronic device housing.

As an optional embodiment, the fiber-optic connector shown in FIG. 5 may be modified to carry electrical signals other than power signals to and/or from electronic device 20 and any device to which the receptacle housing is connected. In WDM systems, for example, these electrical signals may be used to "mark" different channels (different wavelengths). A simple low frequency rectangular signal could be assigned to a certain wavelength. Also, a bus-system (CAN, PCB) could be constructed using several fibers. Thus, in at least this way, the fiber-optic cable of the present invention operates both as an electrical transmission line and an optical transmission line.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example, the fiber-optic cable connector embodiments described up to this point have the verification circuit of the invention incorporated within the receptacle housing. Applicants emphasize that the objectives of the invention may just as easily be accomplished by incorporating the verification circuit into the plug of the connector. Under these circumstances, the fiber-optic cable of the invention would be attached to the receptacle.

Also, the invention may be applied in the situation where the metallized optical fiber connects two optical fiber connectors. In this case, both connectors may include indicator LEDs as previously described, in order to inform users that proper connection has been made at both ends.

Additionally, while a light-emitting diode has been described as being the part of the verification circuit which is activated when a proper optical connection has been established between the plug and receptacle, those skilled in the art can appreciate that other electronic devices may also be used. For example, the light-emitting diode may be replaced with an audible alarm.

What is claimed is:

1. A fiber-optic cable connection, comprising:
   a first connector part including an optical fiber, said optical fiber including a terminal end having a conductive coating; and
   a second connector part adapted to mate with said first connector part, said second connector part having a verification circuit that verifies said first connector part and said second connector part have been connected using said conductive coating.

2. The fiber-optic cable connection of claim 1, wherein said verification circuit includes a contact element within said second connector part disposed at a position which coincides with a location of said conductive coating when said first connector part is connected to said second connector part.

3. The fiber-optic cable connection of claim 2, wherein said conductive coating is located at only a terminal end of said optical fiber.

4. The fiber-optic cable connection of claim 2, wherein said conductive coating extends a length of said optical fiber.

5. The fiber-optic cable connection of claim 2, wherein said verification circuit further includes an electronic device that indicates when said contact element touches said conductive coating.

6. The fiber-optic cable connection of claim 5, wherein said electronic device is located in a housing of said second connector part.

7. The fiber-optic cable connection of claim 5, wherein said electronic device is located in a housing to which said second connector part is connected.

8. The fiber-optic cable connection of claim 5, wherein said electronic device includes one of a light-emitting diode and an audible alarm.

9. The fiber-optic cable connection of claim 5, wherein said verification circuit includes a power source for activating said electronic device, said power source being located in one of said second connector part and a device connector to said first connector part.

10. The fiber-optic cable connector of claim 5, wherein said conductive coating carries electrical signals from a first electronic device connected to said first connector part to a second electronic device connected to said second connector part.

11. The fiber-optic cable connector of claim 2, wherein said contact element is a ring electrode.

12. The fiber-optic cable connector of claim 2, wherein said contact element includes at least two electrodes.

13. A method for verifying an optical connection, comprising:
   providing a first connector part coupled to an optical fiber, said optical fiber having a terminal end with a conductive coating;
   providing a second connector part having a contact element, said contact element disposed at a position which coincides with said conductive coating of said optical fiber when said first connector part and said second connector part are mated; and
   outputting a verification signal when said contact element touches said conductive coating.

14. The method of claim 13, further comprising:
   activating an electronic device based on said verification signal.

15. The method of claim 14, wherein said electronic device includes one of a light-emitting diode and an audible alarm.

16. The method of claim 13, further comprising:
   transmitting optical signals along said conductive coating between two electronic devices.

17. The method of claim 16, wherein at least one of said electronic devices is a network element.

18. A fiber-optic cable connection tester, comprising:
   a connector part adapted to mate with an optical fiber that includes a terminal end having a conductive coating, said connector part having a verification circuit that verifies that said connector part and said optical fiber have been connected using said conductive coating.

19. The fiber-optic cable connection tester of claim 18, wherein said verification circuit includes a contact element within said connector part disposed at a position which coincides with a location of said conductive coating when said connector part and said optical fiber have been connected.

20. The fiber-optic cable connection tester of claim 19, wherein said verification circuit includes an electronic device that indicates when said contact element touches said conductive coating.

21. The fiber-optic cable connection tester of claim 20, wherein said electronic device is located in a housing of said connector part.

22. The fiber-optic cable connection tester of claim 20, wherein said electronic device is located in a housing to which said connector part is connected.

23. The fiber-optic cable connection tester of claim 20, wherein said electronic device includes one of a light-emitting diode and an audible alarm.

24. The fiber-optic cable connection tester of claim 20, wherein said verification circuit includes a power source for activating said electronic device.

25. A method for making an optical connection, comprising:
   providing a first connector part coupled to an optical fiber, said optical fiber having a terminal end with a conductive coating;
   providing a second connector part having a contact element, said contact element disposed at a position which coincides with said conductive coating of said optical fiber when said first connector part and said second connector part are mated; and
   providing an electronic device within said second connector part that indicates when said contact element touches said conductive coating.

26. The method of claim 25, wherein said electronic device is one of a light-emitting diode and an audible alarm.

* * * * *